United States Patent

[11] 3,611,204

[72] Inventors Robert A. Boenning
Timonium, Md.;
Robert W. McNiel, Brodbecks, Pa.

[21] Appl. No. 808,824
[22] Filed Mar. 20, 1969
[45] Patented Oct. 5, 1971
[73] Assignee The United States of America as represented by the Secretary of the Air Force

[54] WIDE PULSE LOW PRF PULSE GENERATOR
1 Claim, 1 Drawing Fig.

[52] U.S. Cl. .......... 331/111, 307/265, 307/273, 307/283, 331/113
[51] Int. Cl. .......... H03k 3/26, H03k 3/281
[50] Field of Search .......... 307/265, 273, 283; 331/113, 111

[56] References Cited

UNITED STATES PATENTS

| | | | |
|---|---|---|---|
| 2,997,665 | 8/1961 | Sylvan | 307/283 X |
| 3,125,730 | 3/1964 | Levy et al. | 307/265 X |
| 3,259,854 | 7/1966 | Marcus et al. | 307/283 X |
| 3,349,255 | 10/1967 | McAvoy | 307/283 X |
| 3,388,346 | 6/1968 | Roof et al. | 307/265 X |
| 3,465,174 | 9/1969 | Soltz | 307/265 X |
| 3,497,725 | 2/1970 | Lorditch, Jr. | 307/283 X |

OTHER REFERENCES

Pub. I " Monostable Multivibrator" by Dorsey in RCA Technical Notes, RCA TN No. 658 dated November 1965–copy in 307–273

*Primary Examiner*—Stanley D. Miller, Jr.
*Attorneys*—Harry A. Herbert, Jr. and Willard R. Matthews, Jr.

ABSTRACT: A pulse generator capable of producing wide low RPF pulses having fast rise and fall times is realized by circuits which alternately drive a bistable device. A multivibrator is periodically placed in a first stable state by a unijunction transistor relaxation oscillator having a slow period of oscillation. The multivibrator is returned to its second stable state by a unijunction transistor circuit that is activated by the first stable state voltage condition of the multivibrator. A time delay circuit associated with the unijunction transistor circuit delays actuation of the unijunction transistor and thus establishes the pulse width of the pulse generator.

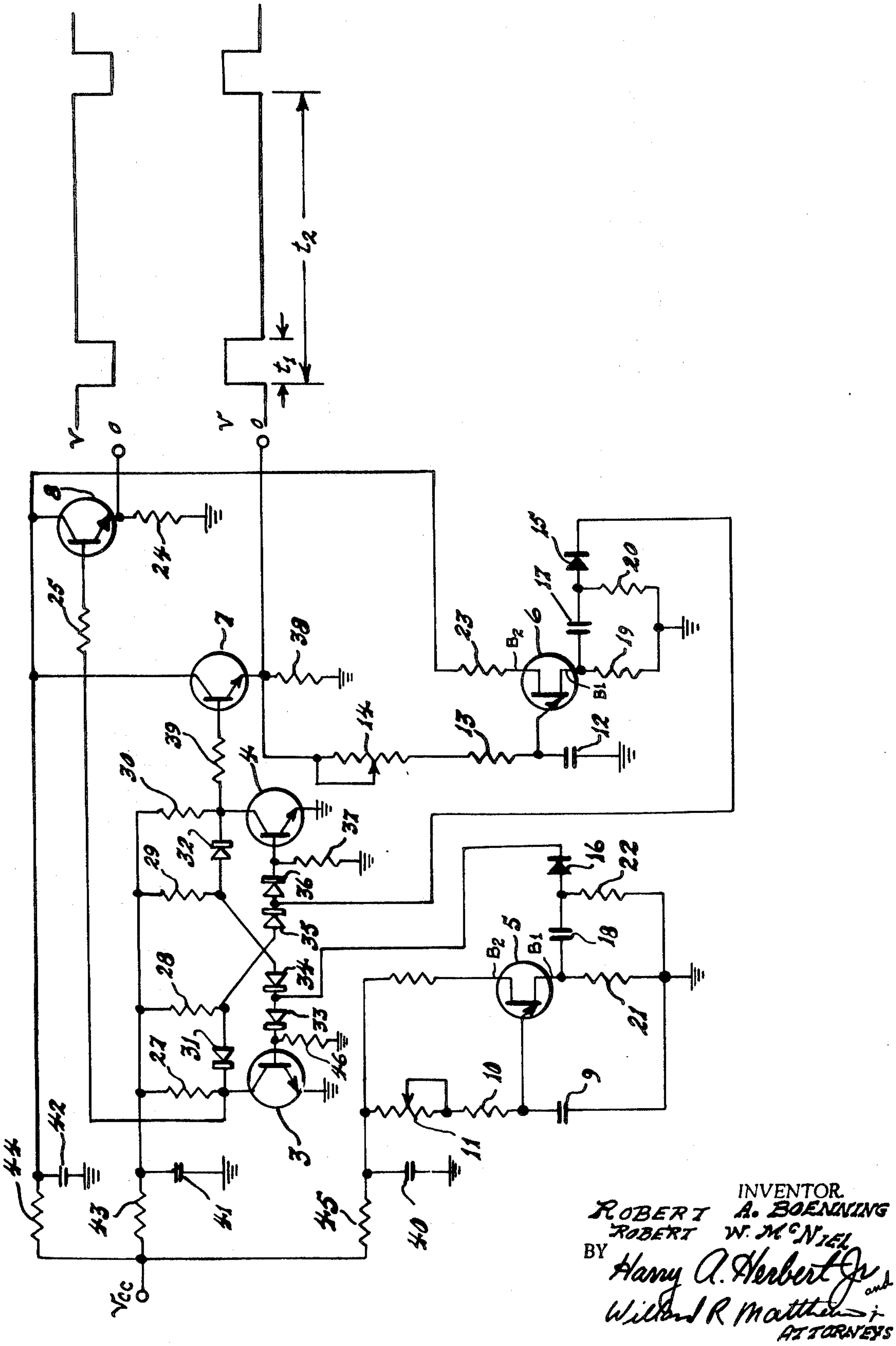
INVENTOR.
ROBERT A. BOENNING
ROBERT W. McNIEL
BY Harry A. Herbert Jr. and
Willard R Matthews, Jr.
ATTORNEYS

WIDE PULSE LOW PRF PULSE GENERATOR

BACKGROUND OF THE INVENTION

The invention relates to pulse generators and in particular to devices used in the checkout of various digital circuits.

The checkout of certain digital circuits requires that wide width, low-repetition rate pulses having fast rise and fall times be used. A typical specification would call for 350 millisecond pulses occurring every 7 seconds with a reference to DC levels of 0 and +28 volts. These pulses would also have to have rise and fall times of less than 1 microsecond.

The conventional approach to the problem has been to trigger a monostable multivibrator having a period of 350 milliseconds at a 7 second rate. This approach has proved unsatisfactory, however, since such a circuit is incapable of providing pulses having acceptable rise and fall times. The limitation is particularly significant with respect to the pulse fall time. This is so because the wide pulse requires a long time constant in the base of the multivibrator transistor resulting in a slow turn on of the transistor at the end of the multivibrator period and a seriously degraded output pulse. The present invention is directed toward overcoming this and other deficiencies common to state of the art pulse generators.

SUMMARY OF THE INVENTION

The present invention comprehends a pulse generator employing a bistable circuit such as a bistable multivibrator that is driven from one state to the other at an appropriate frequency. The circuits of the invention precisely establish the trailing edges of the pulses so generated by utilizing the positive going output voltage of the multivibrator to initiate a timing circuit which determines the width of the output pulse. The multivibrator is periodically put into a first stable condition by a unijunction transistor relaxation oscillator having a period equal to the desired pulse generator pulse output period. The voltage at the nonconducting portion of the multivibrator when in its first stable condition is used to charge the capacitor in an RC delay circuit associated with a monostable trigger circuit. The monostable trigger circuit is placed in its quasi-stable condition when the capacitor is charged. The capacitor then discharges through an integrating circuit to put the multivibrator in its second stable condition and at the same time returning the monostable trigger circuit to its stable condition. The multivibrator remains in its second stable condition until charged by the unijunction transistor relaxation oscillator. A negative-going pulse is thus generated at an output terminal connected to the collector of the multivibrator transistor which conducts during the first stable condition and a positive-going pulse is simultaneously generated at an output terminal connected to the collector of the other multivibrator transistor.

It is a principle object of the invention to provide a new and improved pulse generator for use in digital circuit checkout operations.

It is another object of the invention to provide a pulse generator adapted to produce wide width, low repetition rate pulses having fast rist and fall times.

These, together with other objects, advantages and features of the invention will become more apparent from the following detailed description taken in conjunction with the illustrative embodiment in the accompanying drawing.

DESCRIPTION OF THE DRAWING

The sole FIGURE of the accompanying drawing is a schematic drawing of one presently preferred embodiment of the invention.

DESCRIPTION OF THE PREFERRED EMBODIMENT

The embodiment of the invention disclosed in the accompanying drawing comprises essentially a bistable multivibrator, a unijunction transistor relaxation oscillator and a monostable timing circuit. The bistable multivibrator comprises transistors 3 and 4, steering diodes 31, 32, 33, 34, 35 and 36 and coupling resistors 27, 28, 29, 30, 37 and 46. The unijunction relaxation oscillator comprises unijunction transistor 5, capacitors 9 and 18, diode 16 and resistors 10, 11, 21, 22 and 26. The monostable timing circuit comprises unijunction transistor 6, capacitors 12 and 17, diode 15 and resistors 13, 14, 19, 20, and 23. The resistor-capacitor combinations 40 and 45, 41 and 43, and 42 and 44 provide decoupling for the various circuits. Isolation and low-impedance outputs are provided for the bistable multivibrator by means of emitter followers 7 and 8. Resistors 24, 25 and 38, 39 provide isolation and coupling in the usual manner.

In operation, the bistable multivibrator, consisting of transistors 3 and 4, with their associated coupling circuitry, is driven at a given pulse repetition rate, (7 seconds, for example) by the unijunction relaxation oscillator consisting of unijunction transistor 5 and its associated circuitry. A positive-going pulse from B1 of unijunction transistor 5 drives transistor 3 to saturation, which in turn drives transistor 4 to cutoff. The collector of transistor 4 is coupled to the timing circuit of unijunction transistor 6 by emitter follower 7. When transistor 3 is in the cutoff state, the emitter of transistor 7 is essentially at $V_{cc}$, and capacitor 12 charges through resistors 13 and 14. When the voltage on capacitor 12 reaches a critical value, unijunction transistor 6 conducts, discharging capacitor 12 rapidly through resistor 19. The resulting positive pulse at B1 of unijunction transistor 6 is differentiated by capacitor 17 and resistor 20 and applied to the base of transistor 4 through diode 15, causing transistor 4 to saturate and transistor 3 to cutoff. The desired output pulses are obtained at the emitters of emitter followers 7 and 8. The width of these pulses is determined by resistors 13 and 14 and capacitor 12.

Since both the leading and trailing edges of the output pulse are determined by the application of fast base turnon pulses, the rise and fall times of the output pulse are independent of the pulse width, being limited by the alpha cutoff frequency of the transistors and the storage time of the coupling diodes. The repetition rate and pulse width are limited only by the time constants of the two unijunction RC circuits.

It will be obvious that the general principles herein disclosed may be embodied in many other embodiments widely different from those illustrated without departing from the spirit of the invention as defined in the following claims.

What is claimed is:

1. A wide pulse, low-pulse repetition frequency pulse generator comprising,
   - a supply voltage source,
   - a bistable multivibrator circuit having first and second transistors,
   - first and second pulse generator output terminals,
   - first and second emitter follower transistors, the collector of said first multivibrator transistor being connected through resistance means to said supply voltage source and to the base of said first emitter follower transistor, and the collector of said second multivibrator transistor being connected through resistance means to said supply voltage source and to the base of said second emitter follower transistor, the emitter of said first emitter follower transistor being connected to said first pulse generator output terminal and the emitter of said second emitter follower transistor being connected to said second pulse generator output terminal,
   - a trigger pulse generator for generating trigger pulses at a desired pulse generator pulse repetition frequency comprising a relaxation oscillator utilizing a unijunction transistor and including a capacitor resistance circuit having a time delay characteristic equal to the pulse generator pulse period, said capacitance resistance circuit being connected between one base of said unijunction transistor, ground, and the base of said first multivibrator transistor, the other base of said unijunction transistor being connected through resistance means to said supply voltage source, the emitter of said unijunction transistor being connected through capacitance means to ground and through resistance means to said supply voltage source, and, a monostable circuit having a time delay characteristic equal to the desired pulse generator pulse width, said monostable circuit comprising a relaxation oscillator utilizing a unijunction transistor, the emitter of said monostable circuit unijunction transistor being connected through resistance means to the emitter of said second emitter follower transistor and through capacitance means to ground, a first base of said monostaBle circuit unijunction transistor being connected through a capacitor-resistance circuit to ground and to the base of said second multivibrator transistor, the other base of said monostable circuit unijunction transistor being connected through resistance means to the collector of said first emitter follower transistor.